(12) United States Patent
Lien

(10) Patent No.: US 12,197,030 B2
(45) Date of Patent: Jan. 14, 2025

(54) LENS SET WITH AN ALIGNING STRUCTURE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Chih-Hsien Lien, Miaoli County (TW)

(73) Assignees: Interface Technology (ChengDu) Co., Ltd., Chengdu (CN); Interface Optoelectronics (ShenZhen) Co., Ltd., Shenzhen (CN); General Interface Solution Limited, Miaoli County (TW)

(*) Notice: Subject to any disclaimer, the term of this patent is extended or adjusted under 35 U.S.C. 154(b) by 239 days.

(21) Appl. No.: 17/980,655

(22) Filed: Nov. 4, 2022

(65) Prior Publication Data

US 2024/0111120 A1    Apr. 4, 2024

(30) Foreign Application Priority Data

Sep. 30, 2022 (CN) .......................... 202211208066.0

(51) Int. Cl.
G02B 7/02       (2021.01)

(52) U.S. Cl.
CPC .................... *G02B 7/022* (2013.01)

(58) Field of Classification Search
None
See application file for complete search history.

(56) References Cited

U.S. PATENT DOCUMENTS

| | | | | |
|---|---|---|---|---|
| 9,019,428 B2* | 4/2015 | Shukla | .................. | H04N 17/00 |
| | | | | 348/335 |
| 11,294,137 B2* | 4/2022 | Sohn | ....................... | G02B 7/022 |
| 2006/0140623 A1* | 6/2006 | Yu | ........................... | H04N 23/55 |
| | | | | 396/529 |
| 2009/0015945 A1* | 1/2009 | Chen | ...................... | G02B 7/021 |
| | | | | 359/819 |
| 2016/0033740 A1* | 2/2016 | Bone | ..................... | G02B 7/021 |
| | | | | 359/793 |

* cited by examiner

*Primary Examiner* — Rodney E Fuller
(74) *Attorney, Agent, or Firm* — Locke Lord LLP; Tim Tingkang Xia, Esq.

(57) ABSTRACT

A lens set with an aligning structure includes a plurality of lenses. For two adjacent lenses, when one of these two lenses has a plurality of square accommodating spaces at its peripheral area, the other one has a plurality of triangular pillars with bottom surfaces that are right-angled triangles at its corresponding peripheral area. Each of the aforementioned triangular pillars is accommodated in each of the square accommodating spaces with an inclined surface facing each of the square accommodating spaces.

12 Claims, 12 Drawing Sheets

LENS SET WITH AN ALIGNING STRUCTURE

CROSS-REFERENCE TO RELATED APPLICATIONS

This application claims the priority benefit of China application serial no. 202211208066.0, filed on Sep. 30, 2022. The entirety of the above-mentioned patent application is hereby incorporated by reference herein and made a part of this specification.

BACKGROUND OF THE INVENTION

Field of the Invention

The present disclosure relates to an optical element, especially a lens set with an aligning structure.

Description of the Related Art

Conventional augmented reality (AR) device integrates real world and virtual world information and simulates physical information. For example, a user can view a live image of a real-world location through a mobile device or digital camera that is utilized to create an augmented reality experience by displaying computer-generated content in a real environment.

Both virtual reality (VR) and augmented reality (AR) devices need special lenses to enhance users' visual experience, so the structure and fabrication methods of the lens set get more and more complicated. Such lens set relies on ultra-high-accuracy positioning during assembly so that deviation in structure of the lens set after assembly can be eliminated.

Therefore, a lens set capable of solving the aforementioned drawbacks is desirable.

SUMMARY OF THE INVENTION

Disclosed herein is an exemplary lens set with an aligning structure. Each lens set includes a plurality of lenses. For any two adjacent lenses of which, when one of the two adjacent lenses has a plurality of square accommodating spaces at its peripheral area, the other one has a plurality of triangular pillars with bottom surfaces that are right-angled triangles at its corresponding peripheral area. Furthermore, each of the triangular pillars is accommodated in each of the square accommodating spaces in a way that an inclined surface thereof faces each of the square accommodating spaces.

In another embodiment, when the plurality of lenses are assembled, an inner face of each of the square accommodating spaces faces the inclined surface of each of the triangular pillars, and another opposite inner face of each of the square accommodating spaces engages with a lateral surface of each of the triangular pillars.

In another embodiment, a size of the inclined surface of each of the triangular pillars determines a height between the adjacent lenses after being assembled.

In another embodiment, the plurality of lenses are not parallel to each other after being assembled.

In another embodiment, each of the normal lines of the plurality of lenses has an included angle with a reference axis, and each of the included angles is a function of the size of the inclined surface of each of the triangular pillars.

In another embodiment, the plurality of lenses include: a first lens, wherein one or more of the square accommodating spaces are configured in a peripheral region of a first surface of the first lens; a second lens, wherein one or more of the triangular pillars with bottom surfaces that are right-angled triangles are configured in a peripheral region of a second surface, and one or more of the square accommodating spaces are configured in a peripheral region of an opposite third surface, and wherein the second surface of the second lens is opposite the first surface of the first lens; and a third lens, wherein one or more of the triangular pillars with bottom surfaces that are right-angled triangles are configured in a peripheral region of a fourth surface, and wherein the fourth surface of the third lens is opposite to the third surface of the second lens.

Disclosed herein is another exemplary lens set with an aligning structure. Each lens set includes a plurality of lenses. For any two adjacent lenses of which, when one of the two adjacent lenses has a plurality of non-circular accommodating spaces at its peripheral area, the other one has a plurality of polygonal pillars with bottom surfaces that are polygonal shape at its corresponding peripheral area; and wherein each of the polygonal pillars engages with each of the non-circular accommodating spaces and is accommodated in each of the non-circular accommodating spaces; and wherein the plurality of lenses are not parallel to each other after being assembled.

In another embodiment, a size of a top surface of each polygonal pillars determines a height between the two adjacent lenses after being assembled.

In another embodiment, the plurality of lenses include: a first lens, wherein one or more of the non-circular accommodating spaces are configured in a peripheral region of a first surface of the first lens; a second lens, wherein one or more of the polygonal pillars with bottom surfaces that are polygonal shape are configured in a peripheral region of a second surface, and one or more of the non-circular accommodating spaces are configured in a peripheral region of an opposite third surface, and wherein the second surface of the second lens is opposite the first surface of the first lens; and a third lens, wherein one or more of the polygonal pillars with bottom surfaces that are polygonal shape are configured in a peripheral region of a fourth surface, and wherein the fourth surface of the third lens is opposite to the third surface of the second lens.

Disclosed herein is still another exemplary lens set with an aligning structure. Each lens set includes a plurality of lenses. For any two adjacent lenses of which, when one of the two adjacent lenses has a plurality of non-circular accommodating spaces at its peripheral area, the other one has a plurality of polygonal pillars with bottom surfaces that are polygonal shape at its corresponding peripheral area; and wherein each of the polygonal pillars engages with each of the non-circular accommodating spaces and is accommodated in each of the non-circular accommodating spaces; and wherein each of the normal lines of the plurality of lenses has an included angle with a reference axis, and each of the included angles is a function of a size of a top surface of each of the polygonal pillars.

In another embodiment, the size of the top surface of each of the polygonal pillars determines a height between the two adjacent lenses after being assembled.

In another embodiment, the plurality of lenses include: a first lens, wherein one or more of the non-circular accommodating spaces are configured in a peripheral region of a first surface of the first lens; a second lens, wherein one or more of the polygonal pillars with bottom surfaces that are polygonal shape are configured in a peripheral region of a second surface, and one or more of the non-circular accommodating spaces are configured in a peripheral region of an opposite third surface, and wherein the second surface of the second lens is opposite the first surface of the first lens; and a third lens, wherein one or more of the polygonal pillars with bottom surfaces that are polygonal shape are configured in a peripheral region of a fourth surface, and wherein the fourth surface of the third lens is opposite to the third surface of the second lens.

DESCRIPTION OF THE PREFERRED EMBODIMENTS

First of all, it should be noted that the phrase "aligning structure" appears in the disclosure refers to a structure composed of a protruding portion and a recessed space (or "accommodating space" or "recessed portion"). The aligning structure is used for positioning and combining two components with each other, thereby avoiding positional deviation after combination. It should be noted that, the protruding portion and the recessed space may or may not have corresponding shapes. The aligning structure may also refer to an inter-lock structure. The protruding portion is an exemplary outwardly extending portion of any element and may be formed integrally or non-integrally. In addition, the phrase "Y direction" in the disclosure refers to the direction parallel to the height or the depth of the element in relevant cross-sectional views. In contrast, the phrase "X direction" in the disclosure refers to the direction perpendicular to the height or the depth of the element in relevant cross-sectional views.

Figure 1:
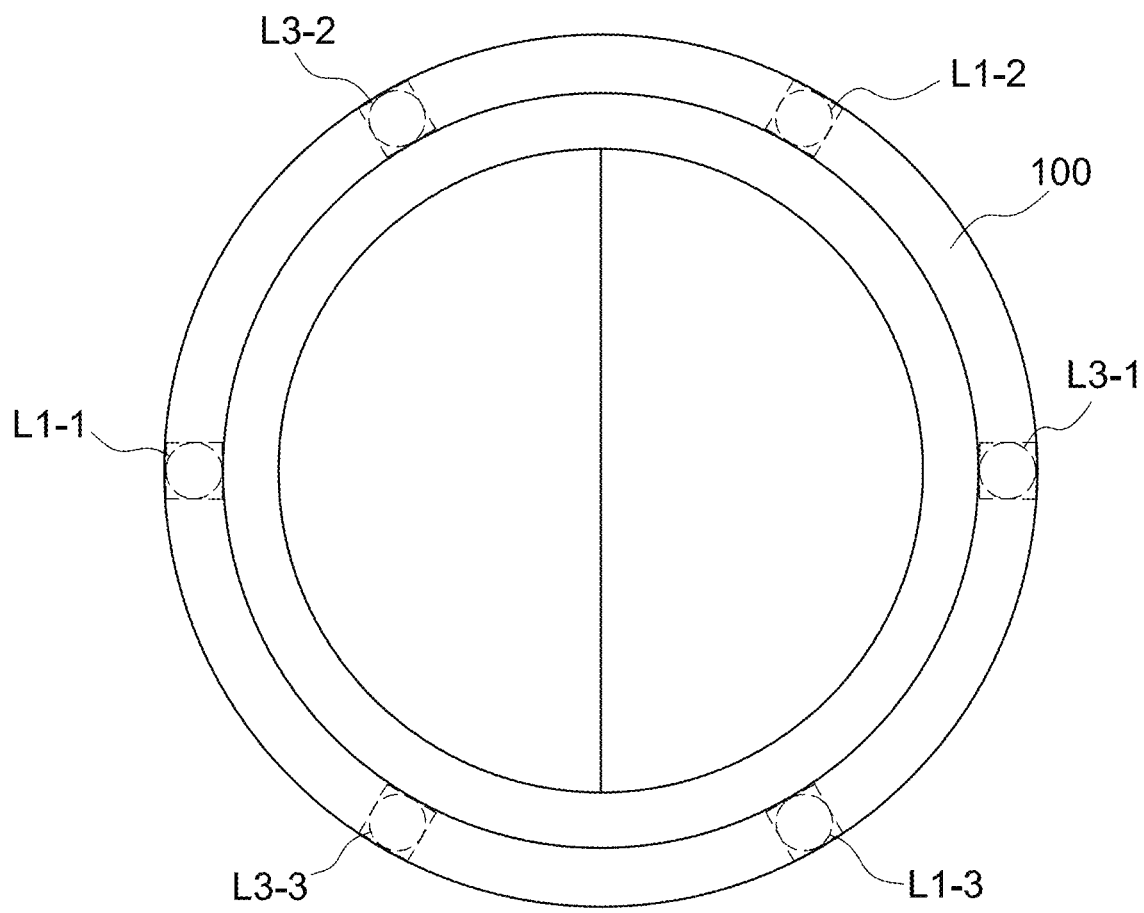
FIG. 1 is a top view of an illustrative lens set with an aligning structure in accordance with a comparative example.
Figure 2:
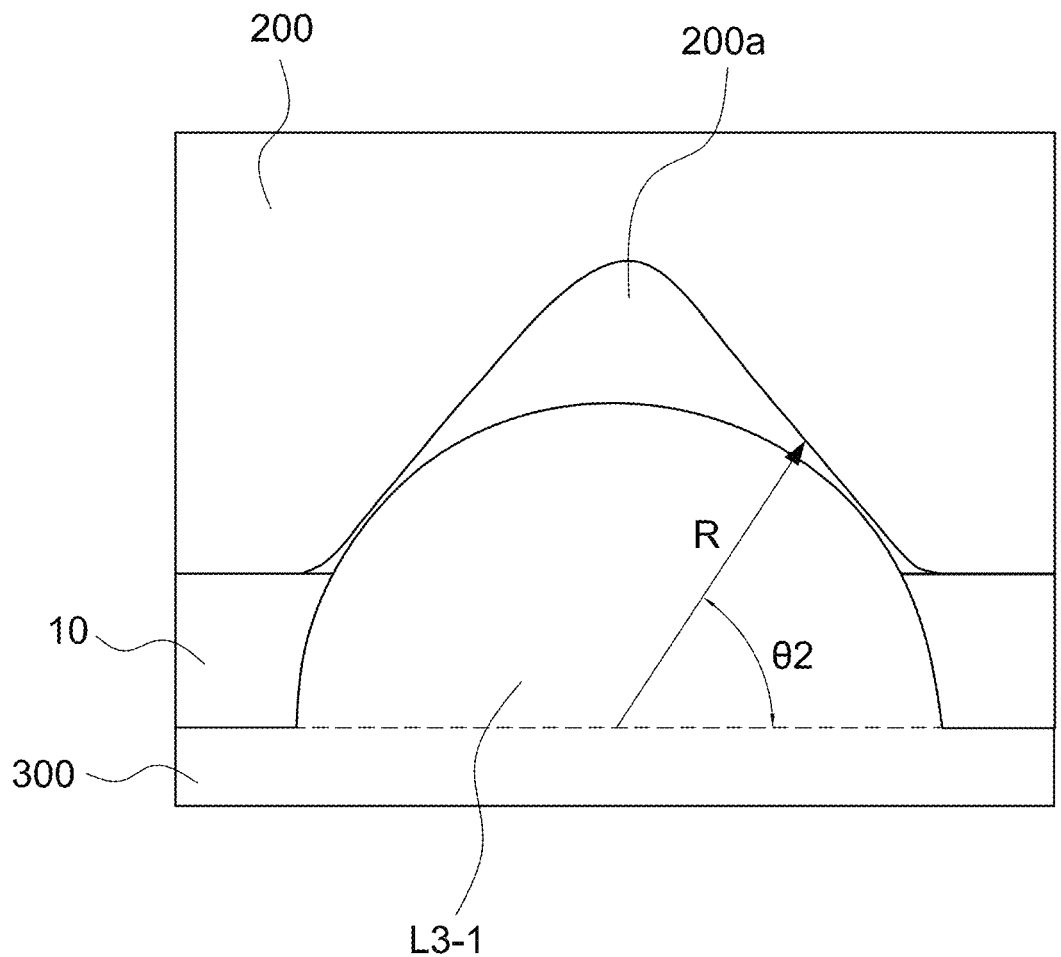
FIG. 2 is a partial enlarged view of an illustrative lens set with an aligning structure in accordance with a comparative example.

Next, as shown in FIG. 1 and FIG. 2, FIG. 1 is a top view of an illustrative lens set with an aligning structure in accordance with a comparative example; and FIG. 2 is a partial enlarged view of an illustrative lens set with an aligning structure in accordance with a comparative example.

Figure 6:
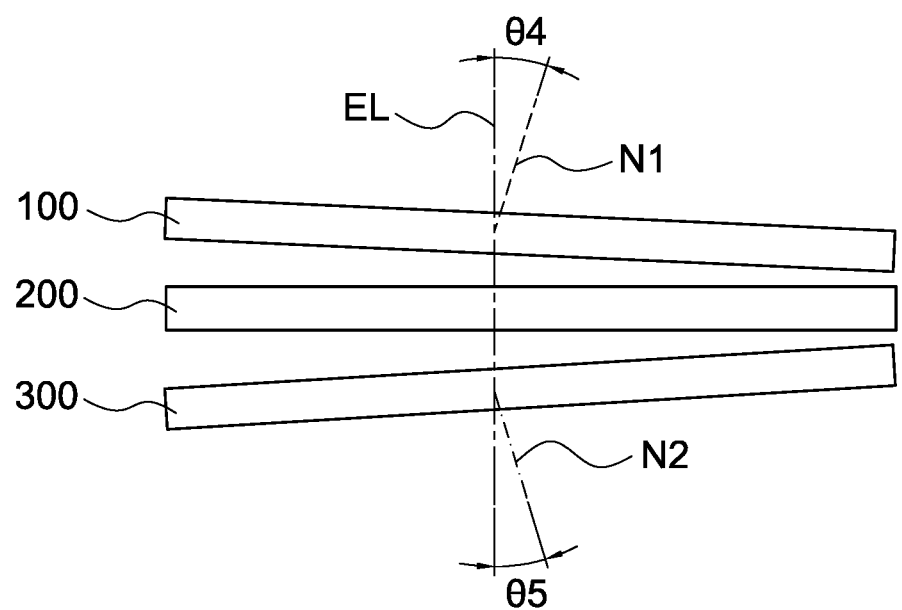
FIG. 6 is a schematic cross-sectional view of an illustrative lens assembly having an aligning structure that is fully assembled in accordance with an embodiment.

As shown in FIG. 1, FIG. 2, and FIG. 6, a comparative example shows that the lens set 1 is composed of a plurality of lenses 100, 200, and 300. The lens 100 and the lens 200 overlaps at the peripheral portion, thereby attaching to each other; and the lens 200 and the lens 300 also overlaps at the peripheral portion, thereby attaching to each other. Particularly, the lens 100, the lens 200, and the lens 300 attach to each other through the protruding portion L1-1, the protruding portion L1-2, the protruding portion L1-3, the protruding portion L3-1, the protruding portion L3-2, and the protruding portion L3-3, thereby achieving the positioning effect.

As shown in FIG. 1, the lens 100 and the lens 200 are adjacent to each other in Y direction and attach to each other through the protruding portions L1-1, L1-2, and L1-3, thereby achieving desired positioning performance. The protruding portion L1-1, L1-2, and L1-3 respectively engage with the corresponding accommodating spaces and form an aligning structure, so that the adjacent lenses 100 and 200 can be combined with a desired positioning precision. Additionally, as shown in FIG. 2 that is a right side view of the lens set 1, the lens 200 and the lens 300 are vertically adjacent to each other and attach to each other through the protruding portions L3-1, L3-2, and L3-3 so that the desired positioning performance is achieved. Furthermore, in one exemplary embodiment, the lens 200 and the lens 300 attach to each other through an adhesive having optical properties such as the optical glue 10. Similarly, the protruding portion L3-1, L3-2, and L3-3 respectively engage with the corresponding accommodating spaces and form an aligning structure, so that the adjacent lenses 200 and 300 can be combined with a desired positioning precision.

In other words, as shown in FIG. 1 that is a top view of the lens set 1 for the comparative example, there are six corresponding aligning structures including the protruding portion L1-1, the protruding portion L1-2, the protruding portion L1-3, the protruding portion L3-1, the protruding portion L3-2, and the protruding portion L3-3 that may be disposed between different lenses, respectively.

In addition, as shown in FIG. 2 of the comparative example depicting a partial enlarged view of the protruding portion L3-1 of the lens set 1, the accommodating space 200a of the lens 200 accommodates the protruding portion L3-1 of the lens 300. As a result, the lens 300 and the lens 200 are positioned and attach to each other through an optical glue 10. In the comparative example, the protruding portion L3-1 is a semicircle, and the accommodating space 200a is a three-dimensional space with a shape in trapezoidal.

However, the inventors found that the lens assembly 1 of the comparative example suffers from the lower positioning performance during assembly as being greatly affected by the angle between a horizontal tangent at the bottom of the accommodating space 200a and the lateral extension line (approximately equal to the angle θ2). Furthermore, the positioning performance during assembly of the lens set 1 is also greatly affected by the radius R of the semicircular protruding portion L3-1.

Figure 3:
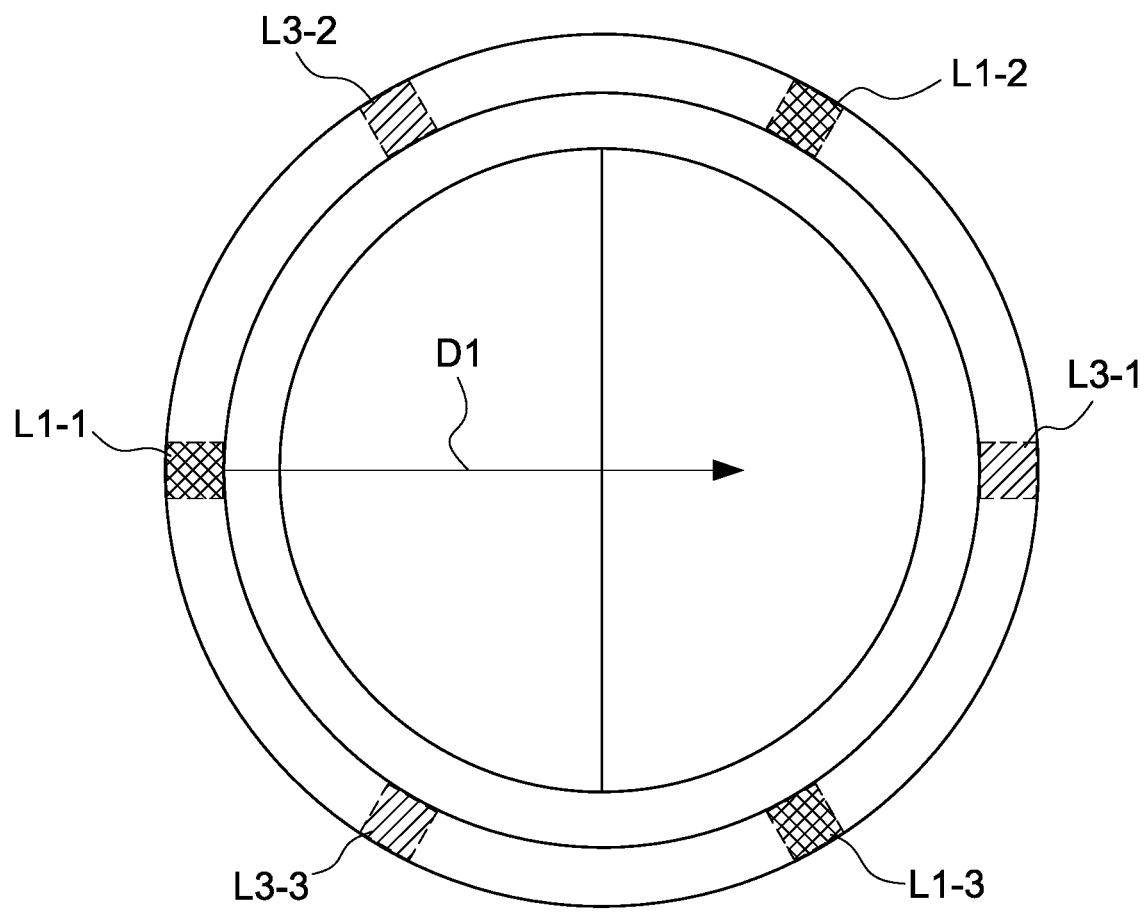
FIG. 3 is a top view of an illustrative lens set with an aligning structure in accordance with an embodiment.
Figure 4:
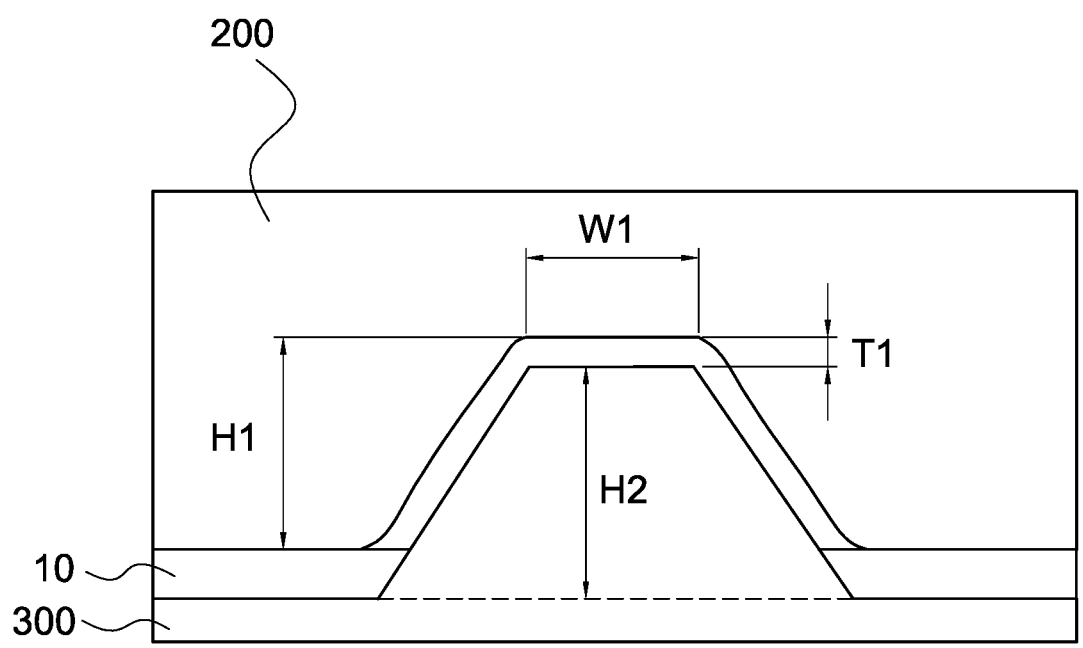
FIG. 4 is a partial enlarged view of an illustrative lens set with an aligning structure in accordance with an embodiment.

In view of this, the following embodiments of the present invention disclose a lens assembly with an aligning structure that can solve the aforementioned drawbacks and problems as follows:

Referring to FIG. 3 to FIG. 6, FIG. 3 is a top view of an illustrative lens set with an aligning structure in accordance with an embodiment; FIG. 4 is a partial enlarged view of an illustrative lens set with an aligning structure in accordance with an embodiment; FIG. is a partial enlarged view of an illustrative lens set with an aligning structure in accordance with an exemplary embodiment; and FIG. 6 is a schematic cross-sectional view of an illustrative lens assembly having an aligning structure that is fully assembled in accordance with an embodiment.

As shown in FIG. 3 to FIG. 6, an aspect of the present disclosure provides a lens assembly with an aligning structure, and the aligning structure is composed of a plurality of lenses 100, 200, and 300. There exists a difference between the exemplary embodiment of FIGS. 3 to 6 and the comparative example of FIGS. 1 to 2. The difference shows that, between the adjacent lenses 100, 200, and 300 in FIG. 3 to FIG. 6, when one has a plurality of non-circular accommodating spaces at its peripheral area, another may have a plurality of protruding portions at its peripheral area of a corresponding surface. In this embodiment, the protruding portions are called polygonal pillar L1-1 and polygonal pillar L1-2, polygonal pillar L1-3, polygonal pillar L3-1, polygonal pillar L3-2, and polygonal pillar L3-3. In addition, each of the polygonal pillars L1-1, L1-2, L1-3, L3-1, L3-2, and L3-3 engages with and is accommodated in each of the non-circular accommodating spaces. Moreover, the lenses 100, 200, and 300 are not parallel to each other after being assembled and forming the lens set with the aligning structure. As shown in FIG. 3, reference symbol D1 represents a distance from the polygonal pillars L1-1 to a connection line between the polygonal pillars L1-2 and L1-3. In one embodiment, D1 is 35.2 mm. In addition, as shown in the embodiment of FIG. 4, each of the polygonal pillars L1-1, L1-2, L1-3, L3-1, L3-2, and L3-3 is, for example, a trapezoidal pillar, and each of the non-circular accommodating spaces is, for example, an accommodating space having a shape in trapezoidal.

As shown in embodiments of FIG. 4 and FIG. 6, a size of a top surface for each of the polygonal pillars L1-1, L1-2, L1-3, L3-1, L3-2, and L3-3 determines a height between the adjacent lenses 100, 200 and 300 after the lenses 100, 200, and 300 are assembled. As shown in FIG. 4, in this exemplary embodiment, the lenses 200 and 300 are adjacent to each other vertically and attach to each other with a high precision in positioning through the aligning structure. Additionally, the lenses 200 and 300 may be further bonded through an adhesive with optical properties such as the optical glue 10. The width W1 for one of the top surfaces of the polygonal pillars L1-1, L1-2, L1-3, L3-1, L3-2, and L3-3 is 0.55 mm, and the height H2 is less than 0.89 mm. The depth H1 of the accommodating space a shape in trapezoidal is 0.89 mm. In other words, there exists a distance T1 between the depth H1 of each accommodating space with a shape in trapezoid and the height H2 of each of the polygonal pillars L1-1, L1-2, L1-3, L3-1, L3-2, L3-3. In addition, in this exemplary embodiment, the lenses are, for example, the first lens 100, the second lens 200, and the third lens 300. The first lens 100 has the non-circular accommodating spaces in a peripheral region of a first surface. The second lens 200 has the polygonal pillars in a peripheral region of a second surface and has the non-circular accommodating spaces in a peripheral region of an opposite third surface. Specifically, the second surface of the second lens 200 is opposite the first surface of the first lens 100. In addition, the third lens 300 has the polygonal pillars L1-1, L1-2, L1-3, L3-1, L3-2, L3-3 with bottom surfaces that are polygonal shape in a peripheral region of a fourth surface, and the fourth surface of the third lens 300 is opposite to the third surface of the second lens 200. As shown in FIG. 6, in one exemplary embodiment, the plurality of lenses 100, 200, and 300 are not parallel to each other after being assembled. The included angle θ4 between the normal line N1 of the lens 100 and the extension line EL in Y direction and the included angle θ5 between the normal line N2 of the lens 300 and the extension line EL in Y direction can be calculated from a correlation formula and are approximately 0.1263 degrees. In other words, in one exemplary embodiment, each of the polygonal pillars L1-1, L1-2, L1-3, L3-1, L3-2, L3-3 engages with each of the non-circular accommodating spaces and is accommodated in each of the non-circular accommodating spaces. Each of the normal lines N1 and N2 of the plurality of lenses respectively has an included angle with a reference axis (i.e., the extension line EL in Y direction), and each of the included angles θ4 and θ5 is a function (or correlation formula) of the size of the inclined surface of each of the triangular pillars, thus, the included angles θ4 and θ5 can be obtained from the function (or correlation formula). Moreover, the included angles θ4 and θ5 is also a function (or correlation formula) of the aforementioned distance D1, the top surface width W1 of each of the polygonal pillars L1-1, L1-2, L1-3, L3-1, L3-2, and L3-3, an angle that the top surfaces of polygonal pillars L1-1, L1-2, L1-3, L3-1, L3-2, and L3-3 deviate from the X direction (hereinafter, referred to as "the deviation angle of the top surface of the pillar"), and an angle that the bottom surface the non-circular accommodating spaces deviates from the X direction (hereinafter, referred to as "the deviation angle of the bottom surface of the accommodation space"). For example, in the exemplary embodiments of FIGS. 3, 4, and 6, for the tolerance of the lens manufacturing process, the tolerance to the deviation angle of the top surface of the pillar or the deviation angle of the bottom surface of the accommodating space is approximately +/−3 degrees; and the tolerance to the dimension in the Y direction is approximately +/−0.01 mm. As shown in FIGS. 3, 4, and 6, when D1 is 35.2 mm, W1 is 0.55 mm, and H1 is 0.89 mm, the included angles θ4 and θ5 can be calculated as 0.1263 degrees through the aforementioned correlation formula based on trigonometric functions.

Figure 5:
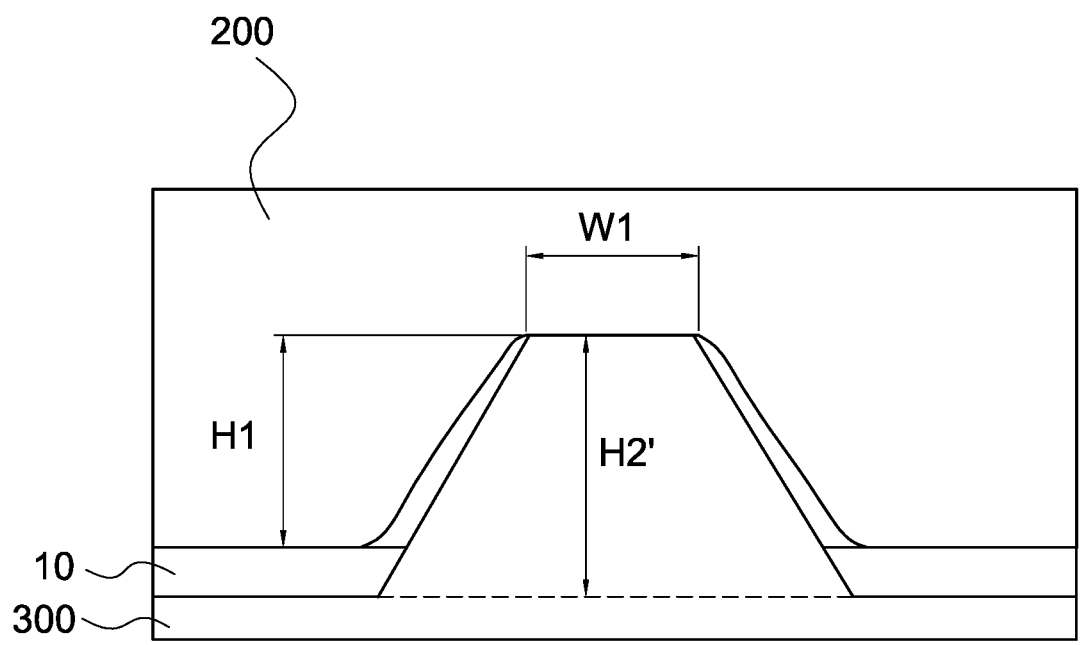
FIG. 5 is a partial enlarged view of an illustrative lens set with an aligning structure in accordance with an embodiment.

In addition, as shown in FIG. 5, there exists no distance between the depth H1 for each accommodating space with a shape in trapezoidal and the heights H2' for each of the polygonal pillars L1-1, L1-2, L1-3, L3-1, L3-2, L3-3, that is, the distance T1 equals zero.

Figure 7:
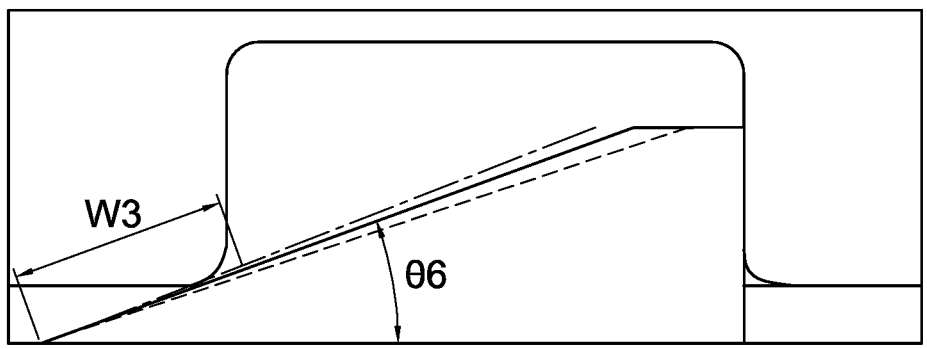
FIG. 7 is a schematic diagram showing an improvement in design error for an illustrative lens set with an aligning structure in accordance with another embodiment.
Figure 8:
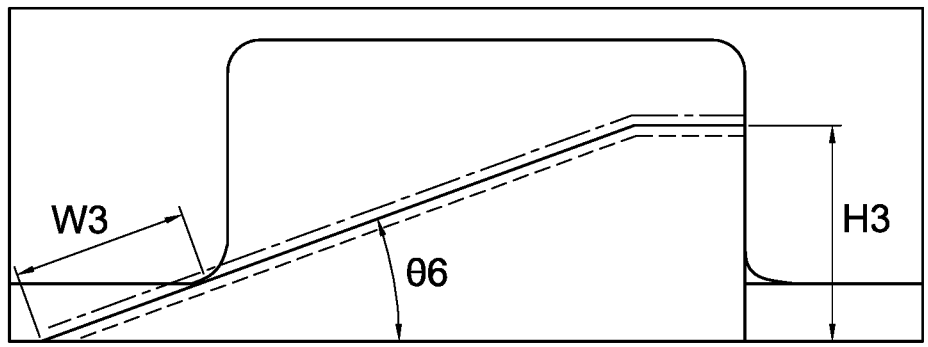
FIG. 8 is a schematic diagram showing an improvement in design error for an illustrative lens set with an aligning structure in accordance with another embodiment.
Figure 9:
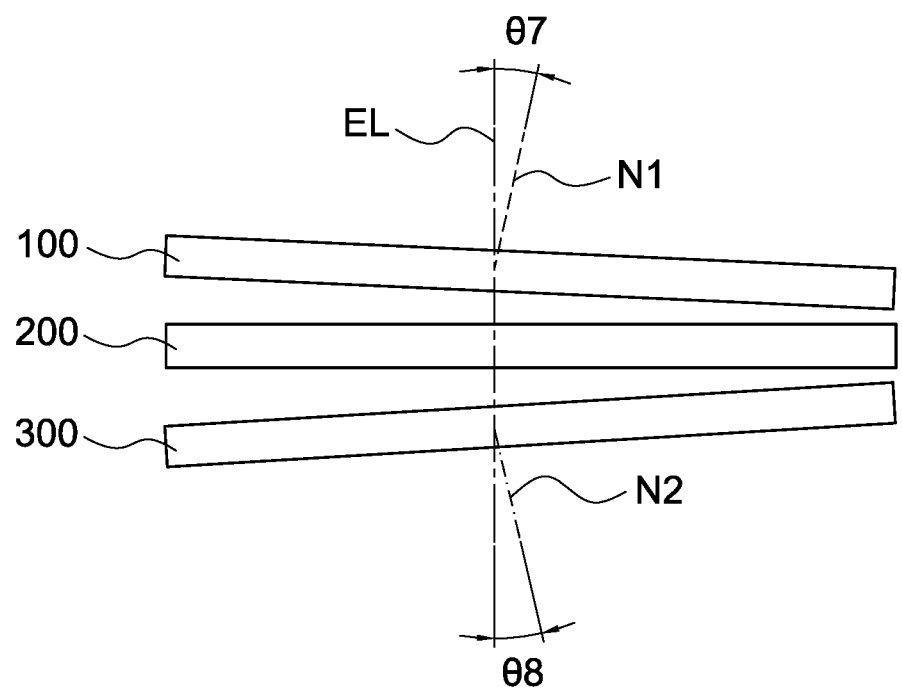
FIG. 9 is a schematic cross-sectional view of an illustrative lens assembly having an aligning structure that is fully assembled in accordance with another embodiment.

Continuing to refer to FIG. 7 to FIG. 9, FIG. 7 is a schematic diagram showing an improvement in design error for an illustrative lens set with an aligning structure in accordance with another embodiment; FIG. 8 is a schematic diagram showing an improvement in design error for an illustrative lens set with an aligning structure in accordance with another embodiment; and FIG. 9 is a schematic cross-sectional view of an illustrative lens assembly having an aligning structure that is fully assembled in accordance with another embodiment.

As shown in FIG. 7 to FIG. 9, another aspect of the present disclosure provides a lens assembly with an aligning structure, and the aligning structure is composed of a plurality of lenses 100, 200, and 300. As shown in embodiments of FIG. 7 and FIG. 8, the lenses 200 and 300 are adjacent to each other vertically and attach to each other with a high precision in positioning through the aligning structure. Furthermore, in one embodiment, the lens 200 and the lens 300 attach to each other through an adhesive having optical properties such as the optical glue 10. There exists a difference between the embodiment of FIGS. 7 to 9 and the embodiment of FIGS. 3 to 6. The difference shows that, between the adjacent lenses 100, 200, and 300 in FIG. 7 to FIG. 9, when one has a plurality of square accommodating spaces at its peripheral area, another may have a plurality of protruding portions at its peripheral area of a corresponding surface. In this embodiment, the protruding portions are triangular pillars having bottom surfaces with a shape of trapezoid or right triangle. It should be noted that triangular pillars having bottom surfaces with a shape of trapezoid as shown in FIG. 7 to FIG. 8 are examples for illustration purposes only, another embodiment may utilize the triangular pillars having bottom surfaces with a shape of right triangle, e.g., the so-called triangular pillar L1-1 and triangular pillar L1-2, triangular pillar L1-3, triangular pillar L3-1, triangular pillar L3-2, and triangular pillar L3-3. In addition, each of the triangular pillars L1-1, L1-2, L1-3, L3-1, L3-2, L3-3 is accommodated in each of the square accommodating spaces, resulting in that any inclined surface of the triangular pillars L1-1, L1-2, L1-3, L3-1, L3-2, L3-3 faces each of the square accommodating spaces.

Continuing to refer to the embodiment of FIG. 7 to FIG. 9, FIG. 7 shows that when the lenses 100, 200, 300 are assembled, an inner face of each of the square accommodating spaces faces the inclined surface of each of the triangular pillars, and another opposite inner face of each of the square accommodating spaces engages with a lateral surface of each of the triangular pillars closely. As a result, the desired positioning performance is achieved. As shown in FIG. 7 and FIG. 8, only the lens 200 and a square accommodating space in the peripheral area of a surface when it faces the lens 300 are shown, and the square accommodating space is used for accommodating the triangular pillar L1-1, the triangular pillar L1-2, triangular pillar L1-3, triangular pillar L3-1, triangular pillar L3-2, or triangular pillar L3-3. It should be noted that, as shown in FIG. 9, in one embodiment, the plurality of lenses 100, 200, and 300 are not parallel to each other after being assembled. The included angle θ7 between the normal line N1 of the lens 100 and the extension line EL in Y direction and the included angle θ8 between the normal line N2 of the lens 300 and the extension line EL in Y direction can be calculated from a correlation formula and are approximately 0.0962 degrees. As shown in FIG. 7 to FIG. 9, in one embodiment, each of the triangular pillars L1-1, L1-2, L1-3, L3-1, L3-2, L3-3 engages with each of the square accommodating spaces and is accommodated in each of the square accommodating spaces. Each of the normal lines N1 and N2 of the plurality of lenses respectively has an included angle with a reference axis (i.e., the extension line EL in Y direction), and each of the included angles θ7 and θ8 is a function (or correlation formula) of the size of the inclined surface of each of the triangular pillars, thus, the included angles θ7 and θ8 can be obtained from the function (or correlation formula). Moreover, the included angles θ7 and θ8 is also a function (or correlation formula) of the aforementioned distance D1, the top surface length W3 of each of the triangular pillars L1-1, L1-2, L1-3, L3-1, L3-2 outside each of the square accommodating spaces, and L3-3, a height H3 of the triangular pillars L1-1, L1-2, L1-3, L3-1, L3-2, and a base angle θ6 of each of the right triangles (or trapezoids). For example, in the embodiments of FIGS. 7 to 9, for the tolerance of the lens manufacturing process, the tolerance to a deviation angle of the base angle θ6 for the right triangles (or trapezoids) is approximately +/−3 degrees; and the tolerance to the dimension in the Y direction is approximately +/−0.01 mm. As shown in FIGS. 7 to 9, when D1 is 35.2 mm, W3 is 0.5 mm, θ6 is 19 degrees and H3 is 0.8 mm, the included angles θ7 and θ8 can be calculated as 0.0962 degrees through the aforementioned correlation formula based on trigonometric functions.

As described above, with regard to the embodiments of FIG. 7 to FIG. 9, FIG. 8 shows that a size of the inclined surface of each of the triangular pillars L1-1, L1-2, L1-3, L3-1, L3-2, L3-3 determines a height between the adjacent lenses after being assembled.

In the embodiments of FIGS. 7 to 9, the lenses 100, 200, and 300 are not parallel to each other after being assembled.

In the embodiments of FIGS. 7 to 9, each of the normal lines N1 and N2 of the plurality of lenses respectively has an included angle θ7 and 08 with a reference axis (i.e., the extension line EL in Y direction), and each of the included angles θ7 and 08 is a function (or correlation formula) of the size of the inclined surface of each of the triangular pillars.

In the embodiments of FIGS. 7 to 9, the lenses are, for example, a first lens 100, a second lens 200, and a third lens 300. One or more square accommodating spaces are configured in a peripheral region of a first surface of the first lens 100. For the second lens 200, one or more of the triangular pillars with bottom surfaces that are right-angled triangles are configured in a peripheral region of a second surface, and one or more of the square accommodating spaces are configured in a peripheral region of an opposite third surface. In addition, the second surface of the second lens 200 is opposite the first surface of the first lens 100. Furthermore, for the third lens 300, one or more of the triangular pillars with bottom surfaces that are right-angled triangles are configured in a peripheral region of a fourth surface, and the fourth surface of the third lens 300 is opposite to the third surface of the second lens 200.

Figure 10:
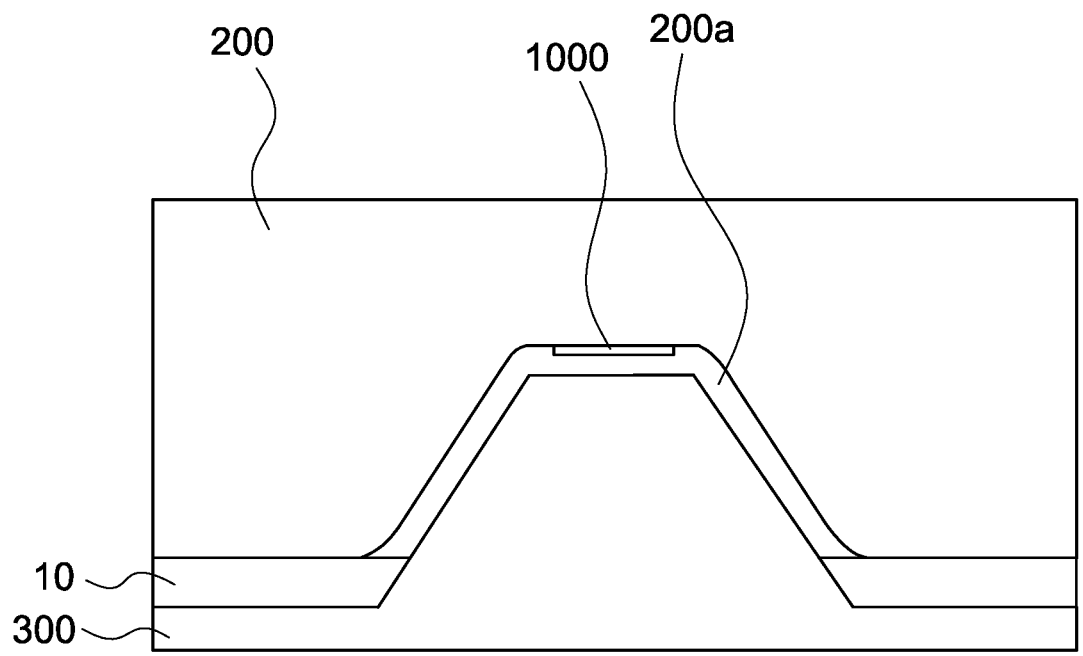
FIG. 10 is a schematic cross-sectional view of an illustrative cursor layer in an aligning structure of a lens set in accordance with an embodiment.
Figure 11:
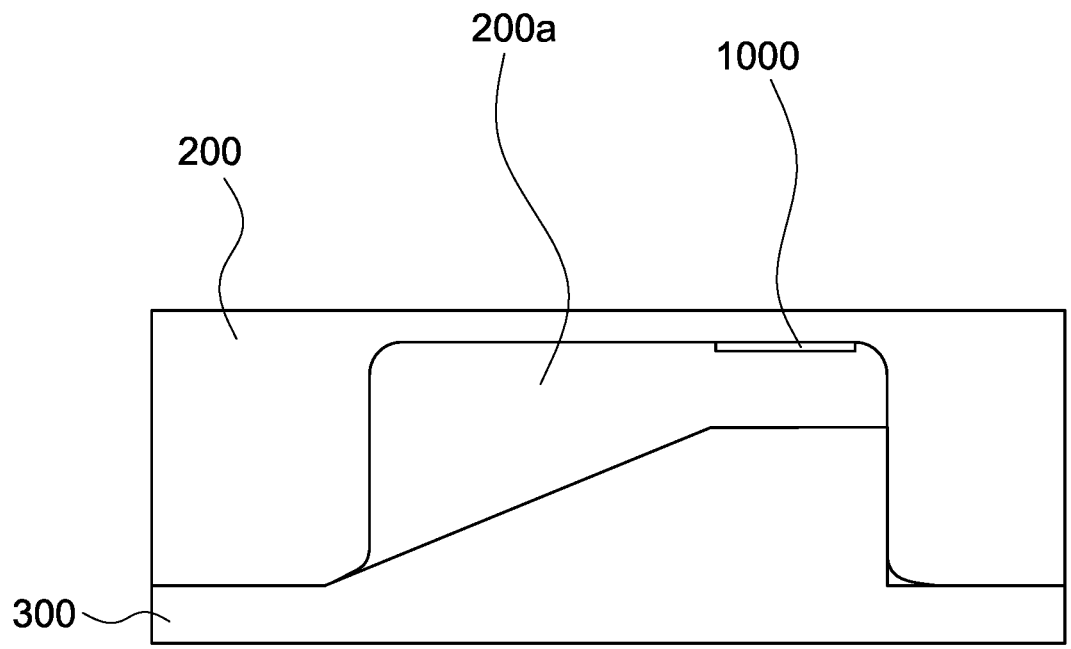
FIG. 11 is a schematic cross-sectional view of an illustrative cursor layer in an aligning structure of a lens set in accordance with another embodiment.
Figure 12:
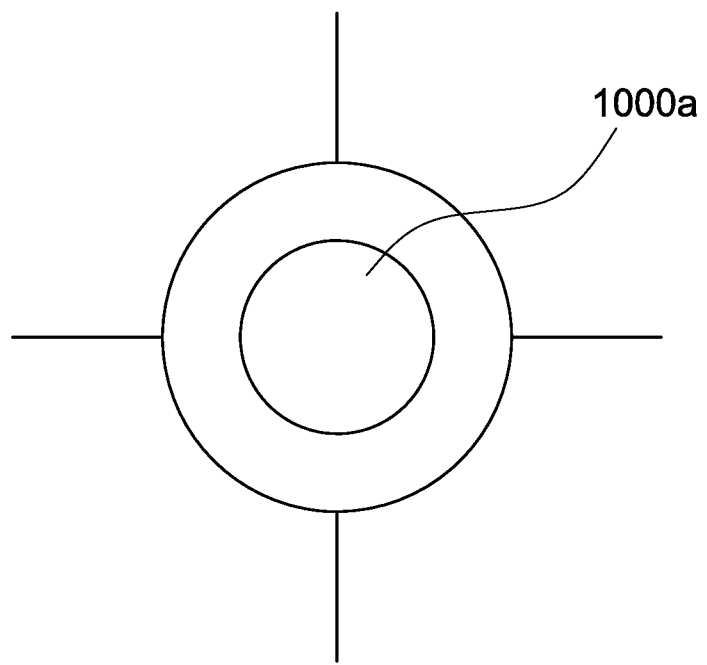
FIG. 12 is a schematic top view of the cursor layer of FIG. 10 or FIG. 11.

Continuing to refer to FIG. 10 and FIG. 11, FIG. 10 is a schematic cross-sectional view of an illustrative cursor layer in an aligning structure of a lens set in accordance with an embodiment; FIG. 11 is a schematic cross-sectional view of an illustrative cursor layer in an aligning structure of a lens set in accordance with another embodiment; and FIG. 12 is a schematic top view of the cursor layer of FIG. 10 or FIG. 11. It should be noted that FIG. 11 also omits the optical glue 10 between the second lens 200 and the third lens 300, but as mentioned above, the second lens 200 and the third lens 300 are also bonded through the optical glue 10.

As shown in FIG. 10 and FIG. 11, a cursor layer 1000 is disposed on a surface of the groove 200a of the second lens 200 that is opposite to any of the aforementioned protruding portions of the third lens 300. The cursor layer 1000 is configured for positioning of any two planes (e.g., the second lens 200 and the third lens 300) and fabricated by photolithography. As shown in FIG. 12, when the cursor layer 1000 is in use, a laser passes through the central transparent area 1000a of the cursor layer 1000. If the two planes are parallel to each other, the light will return along the original path.

While this invention has been described with respect to at least one embodiment, the invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lens set with an aligning structure, each lens set including a plurality of lenses, wherein, for any two adjacent lenses of which, when one of the two adjacent lenses has a plurality of square accommodating spaces at its peripheral area, the other one has a plurality of triangular pillars with bottom surfaces that are right-angled triangles at its corresponding peripheral area; and wherein each of the triangular pillars is accommodated in each of the square accommodating spaces in a way that an inclined surface thereof faces each of the square accommodating spaces.

2. The lens set with an aligning structure of claim 1, wherein:
when the plurality of lenses are assembled, an inner face of each of the square accommodating spaces faces the inclined surface of each of the triangular pillars, and another opposite inner face of each of the square accommodating spaces engages with a lateral surface of each of the triangular pillars.

3. The lens set with an aligning structure of claim 1, wherein a size of the inclined surface of each of the triangular pillars determines a height between the adjacent lenses after being assembled.

4. The lens set with an aligning structure of claim 3, wherein each of the normal lines of the plurality of lenses has an included angle with a reference axis, and each of the included angles is a function of the size of the inclined surface of each of the triangular pillars.

5. The lens set with an aligning structure of claim 1, wherein the plurality of lenses are not parallel to each other after being assembled.

6. The lens set with an aligning structure of claim 1, wherein the plurality of lenses include:
a first lens, wherein one or more of the square accommodating spaces are configured in a peripheral region of a first surface of the first lens;
a second lens, wherein one or more of the triangular pillars with bottom surfaces that are right-angled triangles are configured in a peripheral region of a second surface, and one or more of the square accommodating spaces are configured in a peripheral region of an opposite third surface, and wherein the second surface of the second lens is opposite the first surface of the first lens; and
a third lens, wherein one or more of the triangular pillars with bottom surfaces that are right-angled triangles are configured in a peripheral region of a fourth surface, and wherein the fourth surface of the third lens is opposite to the third surface of the second lens.

7. A lens set with an aligning structure, each lens set including a plurality of lenses, wherein, for any two adjacent lenses of which, when one of the two adjacent lenses has a plurality of non-circular accommodating spaces at its peripheral area, the other one has a plurality of polygonal pillars with bottom surfaces that are polygonal shape at its corresponding peripheral area; and wherein each of the polygonal pillars engages with each of the non-circular accommodating spaces and is accommodated in each of the non-circular accommodating spaces; and wherein the plurality of lenses are not parallel to each other after being assembled.

8. The lens set with an aligning structure of claim 7, wherein a size of a top surface of each polygonal pillars determines a height between the two adjacent lenses after being assembled.

9. The lens set with an aligning structure of claim 7, wherein the plurality of lenses include:
a first lens, wherein one or more of the non-circular accommodating spaces are configured in a peripheral region of a first surface of the first lens;
a second lens, wherein one or more of the polygonal pillars with bottom surfaces that are polygonal shape are configured in a peripheral region of a second surface, and one or more of the non-circular accommodating spaces are configured in a peripheral region of an opposite third surface, and wherein the second surface of the second lens is opposite the first surface of the first lens; and
a third lens, wherein one or more of the polygonal pillars with bottom surfaces that are polygonal shape are configured in a peripheral region of a fourth surface, and wherein the fourth surface of the third lens is opposite to the third surface of the second lens.

10. A lens set with an aligning structure, each lens set including a plurality of lenses, wherein, for any two adjacent lenses of which, when one of the two adjacent lenses has a plurality of non-circular accommodating spaces at its peripheral area, the other one has a plurality of polygonal pillars with bottom surfaces that are polygonal shape at its corresponding peripheral area; and wherein each of the polygonal pillars engages with each of the non-circular accommodating spaces and is accommodated in each of the non-circular accommodating spaces; and wherein each of the normal lines of the plurality of lenses has an included angle with a reference axis, and each of the included angles is a function of a size of a top surface of each of the polygonal pillars.

11. The lens set with an aligning structure of claim 10, wherein the size of the top surface of each of the polygonal pillars determines a height between the two adjacent lenses after being assembled.

12. The lens set with an aligning structure of claim 10, wherein the plurality of lenses include:
a first lens, wherein one or more of the non-circular accommodating spaces are configured in a peripheral region of a first surface of the first lens;
a second lens, wherein one or more of the polygonal pillars with bottom surfaces that are polygonal shape are configured in a peripheral region of a second surface, and one or more of the non-circular accommodating spaces are configured in a peripheral region of an opposite third surface, and wherein the second surface of the second lens is opposite the first surface of the first lens; and
a third lens, wherein one or more of the polygonal pillars with bottom surfaces that are polygonal shape are configured in a peripheral region of a fourth surface, and wherein the fourth surface of the third lens is opposite to the third surface of the second lens.

* * * * *